(12) United States Patent
Rothmund et al.

(10) Patent No.: US 12,712,460 B2
(45) Date of Patent: Aug. 18, 2026

(54) MEDIUM-FREQUENCY TRANSFORMER-BASED DOUBLE-ISOLATED AUXILIARY SUPPLY FOR MEDIUM-VOLTAGE DC/DC CONVERTERS

(71) Applicants: ABB Schweiz AG, Baden (CH); ABB E-Mobility B.V., Delft (NL)

(72) Inventors: Daniel Rothmund, Mülligen (CH); Francisco Canales, Baden-Dättwil (CH); David Baumann, Schafisheim (CH); Daniel Christen, Uster (CH); Levy Costa, Aargau (CH)

(73) Assignees: ABB Schweiz AG, Baden (CH); ABB E-Mobility B.V., Delft (NL)

( * ) Notice: Subject to any disclaimer, the term of this patent is extended or adjusted under 35 U.S.C. 154(b) by 154 days.

(21) Appl. No.: 18/888,641

(22) Filed: Sep. 18, 2024

(65) Prior Publication Data

US 2025/0096691 A1 Mar. 20, 2025

(30) Foreign Application Priority Data

Sep. 19, 2023 (EP) .................................... 23198343

(51) Int. Cl.
*H02M 3/335* (2006.01)
*H01F 27/24* (2006.01)
*H01F 27/28* (2006.01)

(52) U.S. Cl.
CPC ........ *H02M 3/33569* (2013.01); *H01F 27/24* (2013.01); *H01F 27/28* (2013.01);
(Continued)

(58) Field of Classification Search
CPC ......... H02M 3/33523; H02M 3/33569; H02M 3/33571; H02M 3/33576
See application file for complete search history.

(56) References Cited

U.S. PATENT DOCUMENTS 10,666,154 B2 * 5/2020 Yao ................... H02M 3/33576
2015/0271906 A1 * 9/2015 Kamata ................. H02M 3/335 315/111.21

(Continued)

FOREIGN PATENT DOCUMENTS

CN 216749567 U 6/2022
EP 3151403 A2 4/2017

OTHER PUBLICATIONS

Tang et al., An Integrated Dual-Output Isolated Converter for Plug-In Electric Vehicles. IEEE Transactions on Vehicular Technology. pp. 966-976, Feb. 1, 2018.

(Continued)

*Primary Examiner* — Gary A Nash
(74) *Attorney, Agent, or Firm* — McCarter & English, LLP

(57) ABSTRACT

A converter for transferring power from a medium-voltage, MV, to a low-voltage, LV, side is provided. The converter includes at least one DC/AC cell with a MV AC terminal configured for generating an AC voltage from a MV DC voltage, and includes at least one AC/DC cell with a LV AC terminal configured for generating a DC voltage from a LV AC voltage. The converter has a magnetic core with a LV winding, and a LV terminal connected to the LV AC terminal, additionally with a magnetic core with a MV winding, and a MV terminal connected to the MV AC terminal. The converter includes an auxiliary unit with an auxiliary winding, and an auxiliary terminal connected to control circuits for operating the MV DC/AC cell. Galvanic insulation between the LV and the MV winding and the auxiliary winding is configured to withstand the Basic Insulation Level of the converter.

15 Claims, 3 Drawing Sheets

(52) U.S. Cl.
CPC .... *H02M 3/33523* (2013.01); *H02M 3/33571* (2021.05); *H02M 3/33576* (2013.01)

(56) References Cited

U.S. PATENT DOCUMENTS

2019/0089237 A1* 3/2019 Wang ................ H02M 3/33523
2019/0229627 A1* 7/2019 Hande ..................... H02M 1/08

OTHER PUBLICATIONS

European Search Report for Application No. 23198343.8, dated Feb. 1, 2024, 8 pages.

* cited by examiner 100
52
50
48
46
44
12, 25
10
14
16, 22
42
20
24
18
34b
k times
30
28
26
26a
40
34a
32
30a
33
36
38

MEDIUM-FREQUENCY TRANSFORMER-BASED DOUBLE-ISOLATED AUXILIARY SUPPLY FOR MEDIUM-VOLTAGE DC/DC CONVERTERS

CROSS-REFERENCE TO RELATED APPLICATIONS

The present application claims priority to European Patent Application No. 23198343.8, filed on Sep. 19, 2023, and titled "MEDIUM-FREQUENCY TRANSFORMER-BASED DOUBLE-ISOLATED AUXILIARY SUPPLY FOR MEDIUM-VOLTAGE DC/DC CONVERTERS", the disclosure of which is hereby incorporated by reference in its entirety.

TECHNICAL FIELD

Aspects of the present disclosure generally relate to a converter, in particular a converter for transferring power from a medium-voltage (MV) to a low-voltage (LV) side.

BACKGROUND

Isolated DC/DC converters that employ medium-frequency transformers (MFTs) require auxiliary power on both sides of the MFT's insulation barrier to operate control circuitry, power electronic switches, and e.g. fans for cooling. Especially in DC/DC converters that are part of a Solid-State Transformer (SST), the insulation requirements between the medium-voltage (MV) side and the low-voltage (LV) side of the SST are derived from the MV-side grid voltage via standards such as the IEC 62477-2 and require Basic Insulation Levels (BIL). For instance, the BIL of a 15 kV grid voltage corresponds to the range of 95 kV. To fulfill this standard, any possible path between the MV-side and the LV-side must guarantee the required insulation voltage or BIL.

According to the conventional technology, auxiliary power is provided to the MV-side auxiliary circuits directly from the MV-side DC-link which circumvents the BIL requirements. On the other hand, it requires a relatively complex and expensive auxiliary converter given the fact that the MV-side DC-link voltages can be in the range of 2 kV to 10 kV or even higher.

A second option is to employ an external isolated DC/DC converter that is supplied from the LV-side. Since it feeds power from the LV to the MV side, it is required to provide the same insulation voltage as the MFT which makes is large and expensive although it might only be rated for a comparably low power.

Thus, there is a need for an improved converter, particularly a converter suitable for use with medium voltages.

BRIEF DESCRIPTION

In view of the above, the present disclosure as set out in the appended set of claims is provided. Specific embodiments are provided in the following description and the accompanying figures.

Technical terms are used by their common sense. If a specific meaning is conveyed to certain terms, definitions of terms will be given in the following in the context of which the terms are used.

According to an aspect, a converter for transferring power from a medium-voltage (MV) to a low-voltage (LV) side is described. The converter includes at least one DC/AC cell configured for generating an AC voltage from a MV DC voltage, the DC/AC cell having a MV AC terminal. The converter further includes at least one AC/DC cell configured for generating a DC voltage from a LV AC voltage, the AC/DC cell having a LV AC terminal.

The converter also has a magnetic core with a LV winding being wound around the magnetic core and the LV winding having a LV winding terminal. The LV winding terminal is connected to the LV AC terminal of the at least one AC/DC cell. The converter has a MV winding being wound around the magnetic core and having a MV winding terminal. The MV winding terminal is connected to the MV AC terminal of the at least one DC/AC cell.

The converter includes an auxiliary unit having an auxiliary winding being wound around the same magnetic core and having an auxiliary winding terminal. The auxiliary winding terminal is connected to control auxiliary circuits for operating the MV DC/AC cell. The converter further has a galvanic insulation to galvanically insulate the LV winding from the MV winding and the auxiliary winding. The galvanic insulation between the LV and the MV winding and the auxiliary winding is configured to withstand the Basic Insulation Level (BIL) of the converter. The BIL, as used herein, typically refers to at least 10 kV.

Medium-voltage, as used herein, may refer to voltages above 1 kV, such as a voltage between 1 kV-52 kV, or particularly 1 kV-33 kV. For example, a medium voltage may be a voltage received, and optionally rectified, from a medium voltage grid, such as a 10 kV grid, a 15 kV grid, a 20 kV grid, a 25 kV grid, a 30 kV grid, or even a 50 kV grid. A low voltage may refer to a voltage of approximately at least 200 V, such as a voltage between 200 V-1,5 kV in particular a voltage between 200 V-1 kV.

Further features are derivable from the dependent claims.

According to aspects, the galvanic insulation between the LV and the MV winding may be configured to withstand a voltage difference of at least 52 kV, 65 kV or even 95 kV, in particular of 170 kV, 200 kV or even 250 kV. The voltage difference may correspond to a BIL. The BIL for a 12,5 kV MV grid may correspond to 60 kV. The BIL for a 17,5 kV MV grid may correspond to 95 kV. The BIL for a 33 kV MV grid may correspond to 170 kV, or even 200 kV.

According to aspects, the galvanic insulation of the converter may provide a distance between the LV winding and the MV winding in the range of 15 mm to 20 mm, in particular of 15 mm, 17 mm or 20 mm. In embodiments, the distance between the LV winding and the MV winding may correspond to 25 mm. Alternatively, the distance between the LV winding and the MV winding may be in the range of 2 mm to 4 mm. Said distance may also be in the range of 4 mm to 10 mm. The distance between the LV winding and the MV winding may depend on the insulation material used. For epoxy resins, the distance between the LV winding and the MV winding may be larger than for oil. When oil is used as an insulation material, the distance between the LV winding and the MV winding may be the range of 2 mm to 4 mm. When air is used as an insulation material, the distance between the LV winding and the MV winding may adhere to 1 kV/mm.

The LV winding, the MV winding and the auxiliary winding may be immersed and/or submerged in the insulation material. The insulation material may be contained in a tank, vessel or any other kind of container. The insulation material may be liquid, solid, or gaseous.

According to aspects, the converter may have MV bushings. The MV bushings may be rated for a dielectric insulation to withstand the BIL of the converter. The conductors of the terminal of the MV winding and the conductors of the terminal of the auxiliary winding of the auxiliary unit may be fed through the same bushings. In particular, the converter may have a first MV bushing, and at least one conductor of the terminal of the MV winding and at least one conductor of the terminal of the auxiliary winding of the auxiliary unit may both be fed through the first bushing. In addition, the converter may have a second MV bushing, and at least one other conductor of the terminal of the MV winding (and optionally but not necessarily at least one other conductor of the terminal of the auxiliary winding) may be fed through the second bushing.

The bushing may provide access to container in which the windings are immersed in the insulation material.

The bushings may be arranged on the container, or on the wall of the container. The bushings may allow for electric connection to the MV winding and the auxiliary winding. In the case of a liquid insulation material, the bushings may be provided within a through-hole provided in the container containing the electrically insulating liquid. In the case of a solid insulation material, the bushings may provide a passage extending at least partially trough the solid insulation material. The bushings may be configured to provide a MV insulation. In embodiments, the bushings may also be provided in form of a stub formed integrally with the electric insulation surrounding the coil.

According to aspects, the MV winding and the auxiliary winding of the auxiliary unit may be wound proximally in the axial direction of the core. The distance between the MV winding and the auxiliary winding in axial direction may be in the range of 2 mm to 5 mm, in particular in the range of 3 mm to 5 mm.

According to aspects, the terminal of the auxiliary winding may be connected to the terminal of the auxiliary unit.

According to aspects, a series of a resonant capacitor, a diode rectifier and a DC capacitor may be connected between the terminal of the auxiliary winding and the terminal of the auxiliary unit. Alternatively, a series of a diode rectifier and a DC capacitor may be connected between the terminal of the auxiliary winding and the terminal of the auxiliary unit. In the latter case, the resonant capacitor may be omitted.

According to aspects, the auxiliary unit may further include a further magnetic core and a primary and at least one secondary winding being wound around the further magnetic core. The primary winding being connected to the auxiliary winding. The at least one secondary winding having a further terminal, the further terminal being connected to the terminal of the auxiliary unit. The auxiliary unit may also have a further galvanic insulation to galvanically insulate the primary winding from the at least one secondary winding.

The auxiliary unit described within the above paragraph may provide an additional transformer within the converter. Beneficially, the additional transformer may provide individual voltage levels by the secondary windings and galvanic isolation among them, as well to the winding being wound around the core.

According to aspects, the further terminal of the at least one secondary winding may be connected to the terminal of the auxiliary unit.

A series of a resonant capacitor, a diode rectifier and a DC capacitor may be connected between the further terminal of the at least one secondary winding and the terminal of the auxiliary unit. Alternatively, a series of a diode rectifier and a DC capacitor may be connected between the further terminal of the at least one secondary winding and the terminal of the auxiliary unit. In the latter case, the resonant capacitor may be omitted.

Herein, auxiliary unit may be understood as an entity that may have circuitry to supply auxiliary circuits, control equipment or other equipment of the converter with power. Its terminal may provide a single reference voltage or a series of reference voltages. In the latter case, the reference voltages may be of the same voltage level, of different voltage levels, or partly of the same and partly of different voltage levels.

Terminal, as used herein, may refer to connection points of an entity or sub-unit of the converter. The terminals may not necessarily require a special physical connection point but may present a transition-free connection of one sub-unit to another one. Unless specified otherwise, a connection, in particular between any two entities or terminals, including in particular nodes, points, elements, devices, etc. or combinations thereof, may refer to an electrically conductive connection, as in particular established by a wire, cable, busbar, a conductive track, trace or line on e.g. a (printed) circuit board, solder, etc. In some embodiments, the electrically conductive connection may be at least substantially direct, in particular without any discrete elements, as, in particular, resistors, capacitors, inductors, or other passive or active elements or devices connected between the connected entities. However, in some cases, an electrically conductive connection may include discrete elements, such as resistors or capacitors. Terminal may be in particular understood herein as providing two connection points or more than two connection points.

According to aspects, the at least one DC/AC cell may include a further terminal and the converter may have at least one further AC/DC cell configured for generating a DC voltage from a MV AC voltage. The at least one further AC/DC cell may be arranged at the MV side of the converter, and may also be referred to as MV AC/DC cell. The at least one further AC/DC cell may have a terminal. The converter may also have at least one DC link being connected to the terminal of the at least one further AC/DC cell and the further terminal of the at least one DC/AC cell. The terminal of the auxiliary unit may be connected to control auxiliary circuits for operating the at least one further AC/DC cell. The DC link may include one or more capacitors. Beneficially, the DC link may be configured to buffer input and/or output voltages of the converter.

According to aspects, the auxiliary circuits for operating the DC/AC cell and/or the AC/DC cell may include electronic switches, in particular active electronic switches. Examples for active electronic switches may include power semiconductor switches such as metal-oxide-semiconductor field-effect transistors (MOSFET), insulated-gate bipolar transistors (IGBT), high-electron-mobility transistors (HEMT), or integrated gate-commutated thyristors (IGCT) or any other type of transistors and/or thyristors, but are not limited thereto.

The electronic switches may have control inputs. For example, each electronic switch may have a control input, such as a gate, base or trigger. The control input may be configured for receiving a control signal for selectively switching the electronic switch into either a conducting, i.e. closed state, or a non-conducting, i.e. open state. The terminal of the auxiliary unit may be connected to the gate driver circuits of MOSFET or IGBT switches of the converter.

According to aspects, the switches of the control equipment for operating the AC/DC may be connected in any of a full-bridge, a half-bridge, flying-capacitor-based bridge configurations, or diode-clamped configurations.

According to aspects, the terminal of the auxiliary unit may be typically configured to provide a power of ten to hundreds of watts. The auxiliary unit may provide at least one auxiliary power of at least 10 W, in particular at least 50 W, or even at least 100 W. The terminal of the auxiliary unit may be configured to provide at least one auxiliary power in the range of 100 W-200 W, in particular 110 W, 120 W or 130 W. The terminal of the auxiliary unit may be configured to provide at least one auxiliary power in the kilowatt range of 1 kW to 10 KW, in particular of 1 kW, 2 KW or even 8 kW.

According to aspects, the auxiliary power generated by the auxiliary unit of the converter is lower than the rated power of the MV power. In particular, the auxiliary power may be less than 5%, less than 2%, less than 1%, less than 0.5%, less than 0.2% or even less than 0.1% of the rated power of the MV power.

Beneficially, the effects of drawing an auxiliary power from the core may be negligible. In particular, core saturation effects and an effect on grid current harmonics may be limited, or even unnoticeable.

According to aspects, the converter may further include fans and the terminal of the auxiliary unit may be connected to the fans. Fans may be considered equipment or auxiliary equipment of the controller. In embodiments, a fan may require auxiliary power of 1 kW of the auxiliary unit.

The converter may be a medium-frequency or high-frequency converter. The converter may be a solid-state transformer, a three-stage solid state transformer, and/or a medium-frequency solid state transformer. The converter may be a dual-active bridge (DAB) converter.

According to aspects, the converter may be configured for converting power bidirectionally. The converter may transfer power from MV to LV. The converter may transfer power from LV to MV.

The terminal of the auxiliary unit may provide at least one reference voltage which may correspond to the reference voltages of the at least one further winding.

Further advantages, features, aspects and details that can be combined with embodiments described herein are evident from the dependent claims, the description and the drawings.

BRIEF DESCRIPTION OF DRAWINGS

The details will be described in the following with reference to the figures, wherein.

DETAILED DESCRIPTION

Figure 1:
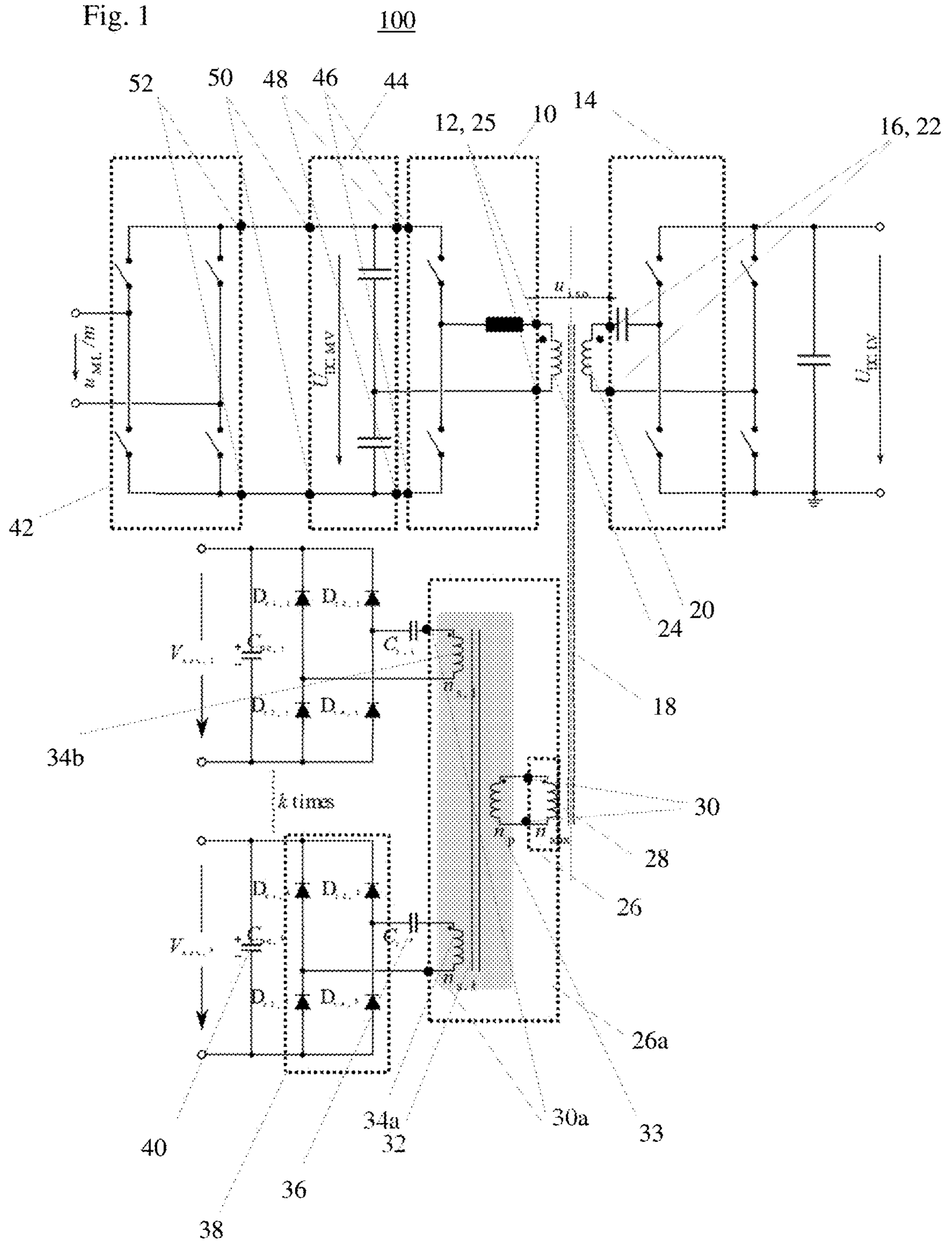
FIG. 1 is a schematic circuit diagram of a converter according to an embodiment.

In the following, embodiments are set forth to describe specific examples presented herein. The person skilled in the art will recognize that one or more other examples and/or variations of these examples may be practiced without all the specific details outlined below. Also, well known features may not be described in detail so as not to obscure the description of the examples herein. For the ease of illustration, like reference numerals are used in different figures to refer to the same elements or additional instances of the same element. Features illustrated or described as part of one embodiment can be used on or in conjugation with any other embodiment to yield yet a further embodiment. The figures represent schematic diagrams and do not necessarily represent dimensions or measurements of real embodiments and/or are not necessarily drawn to scale.

Referring now to the drawings, FIG. 1 presents a schematic circuit diagram of a converter 100 according to an embodiment. The converter may be a medium-frequency transformer for transferring power from a MV to a LV side. The converter 100 has at least one DC/AC cell 10 with a MV AC terminal 12. The DC/AC cell 10 may generate an AC voltage from a MV DC voltage. The converter further has at least one AC/DC cell 14 with a terminal 16. The AC/DC cell may generate a DC voltage from a LV AC voltage being input at terminal 16.

According to embodiments, the MV side with DC/AC cell 10 may correspond to a primary side to a transformer and, respectively, the LV side with AC/DC cell 14 to a secondary side of a transformer, although the present disclosure is not limited thereto.

A magnetic core 18 is further part of the converter 100. A LV winding 20 and a MV winding 24 is wound around the magnetic core 18. The LV winding 20 has a LV winding terminal 22 which is connected to the LV AC terminal 16 of the at least one AC/DC cell. The MV winding 24 has a MV winding terminal 25 which is connected to the MV AC terminal 12 of the at least one DC/AC cell 10.

The converter 100 also includes an auxiliary unit 26 with an auxiliary winding 28 being wound around the magnetic core 18. The auxiliary unit 26 has an auxiliary winding terminal 30 which is connected to control auxiliary circuits for operating the MV DC/AC cell.

A galvanic insulation (not shown) galvanically insulates the LV winding 20 from the MV winding 24 and the auxiliary winding 28. The galvanic insulation between the LV winding 20 and the MV winding 24 and the auxiliary winding is configured to withstand the Basic Insulation Level (BIL) of the converter 100. The galvanic insulation may provide a distance between the LV winding 20 and the MV winding 24 in the range of 15 mm to 20 mm, as will be described with reference to FIG. 3.

The auxiliary unit of the converter 100 may be configured such that the terminal 30 of the auxiliary winding 28 may be directly connected to the terminal of the auxiliary unit, as exemplarily illustrated by auxiliary unit 26.

Alternatively, the auxiliary winding 28 may be connected to the primary winding 33 of a further transformer with a magnetic core 32, as exemplarily illustrated by auxiliary unit **26*a*. One or more secondary windings 34*a*, 34*b* may be wound around the further magnetic core 32. A galvanic insulation (not shown) may galvanically insulate the auxiliary winding 28 from the one or more secondary windings 34*a*, 34*b* and/or the primary winding 33 from the one or more secondary windings 34*a*, 34*b* and/or may galvanically insulate the one or more secondary windings 34*a*, 34*b*** from each other.

The gray colored part of the auxiliary unit **26*a* may represent an additional transformer of the converter 100. The auxiliary unit 26*a* may be used to adapt DC voltage levels of the one or more secondary windings 34*a*, 34*b* individually. Beneficially, individual loads on the MV-side of the converter 100 which may be referenced to different potentials may be supplied by the auxiliary unit 26*a***.

The secondary windings **34*a*, 34*b* may have the same or a different number of turns. Although two secondary windings are illustrated within FIG. 1**, the disclosure is not limited thereto. Rather, any purposeful number of secondary windings are within the scope of the present disclosure. In embodiments with more than two secondary windings, the windings may have partly the same and partly different number of turns, or all the same number of turns or all a different number of turns.

In case of auxiliary unit 26, a series of resonant capacitors, a diode rectifier and a DC capacitor may be connected between the terminal of the auxiliary winding and the terminal of the auxiliary unit or a series of a diode rectifier and a DC capacitor may be connected between the terminal of the auxiliary winding and the terminal of the auxiliary unit (not shown).

In case of auxiliary unit 26*a*, each of the secondary windings may be followed by a series of a resonant capacitor 36, a diode rectifier 38 and a DC capacitor 40 as exemplarily illustrated with reference to secondary winding 34*a*. Beneficially, the resonant capacitor 36 may reduce the winding's root mean square (rms) current and may achieve a stable gain, while the DC capacitor 40 may buffer the voltage provided by the winding. Although illustrated within FIG. 1, the resonant capacitor 36 may be omitted in embodiments.

As becomes apparent with reference to auxiliary units 26 and 26*a*, terminal may be understood herein as providing two or more connection points. The terminal 30 of the auxiliary winding 28 may be connected to the terminal of the auxiliary unit 26, while the terminals of the secondary windings 34*a*, 34*b* may be connected to the terminal 30*a* of the auxiliary unit 26*a*.

The converter 100 may have one or more further AC/DC cell 42 that may be configured for generating a DC voltage from a MV AC voltage. The further AC/DC cell may be arranged at the MV side of the converter 100, and thus may also be referred to as MV AC/DC cell 42, and may have at terminal 52. The converter 100 may also have at least one DC link 44 with terminals 48 and 50. Beneficially, the DC link 44 may include one or more DC capacitors which may buffer input and/or output voltages of the converter 100. The at least one DC/AC cell 10 may have a further terminal 46.

The DC link 44 may be connected between the MV AC/DC cell 42 and the DC/AC cell 10, it may in particular be connected with its terminal 50 to the terminal 52 of the MV AC/DC cell 42 and with its terminal 48 to terminal 46 of the DC/AC cell 10. The terminal 30*a* of the auxiliary unit 26, 26*a* may be connected to control auxiliary circuits for operating the AC/DC cell 42 (not shown).

The auxiliary circuits for operating the DC/AC cell 10 and/or the AC/DC 42 cell may comprise switches. The switches may be part of control equipment for operating the AC/DC 42. The switches may be connected in a full-bridge as shown although present disclosure is not limited thereto. Also, a half-bridge, flying-capacitor-based bridge configurations or diode-clamped configurations may be employed and are within the scope of the disclosure.

Figure 2:
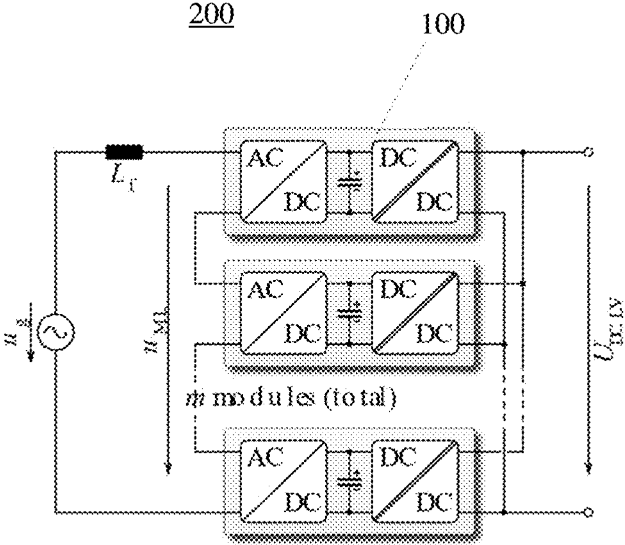
FIG. 2 is a schematic diagram of a converter according to an embodiment.

Now referring to FIG. 2 which illustrates a simplified schematic diagram of a converter 200. The converter 200 may convert a MV, UML, to a LV, UDC,LV. The converter 200 may have a number m of modules, each module may correspond to the converter 100 described with respect to FIG. 1.

The converter 100 may be a medium-frequency or high-frequency converter or transformer. The converter 100 may be a solid-state transformer, a three-stage solid state transformer, and/or a medium-frequency solid state transformer. The converter 100 may be a dual-active bridge converter.

Figure 3:
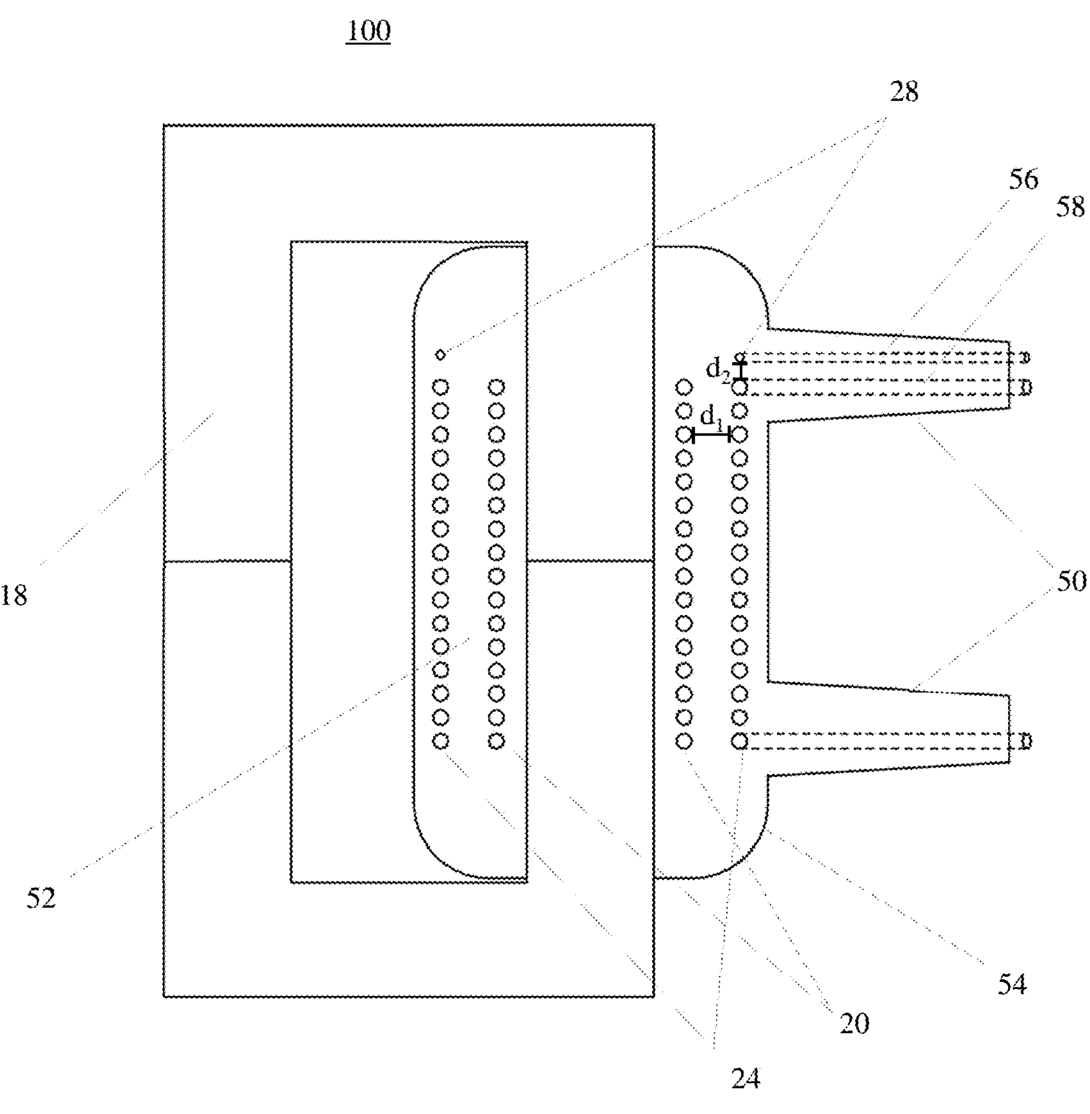
FIG. 3 is a schematic diagram of aspects of a converter according to an embodiment.

Now referring to FIG. 3 which schematically illustrates aspects of the converter 100 according to an embodiment. As explained with reference to FIG. 1, the converter 100 has a core 18 with a LV winding 20, a MV winding 24, and an auxiliary winding 28 being wound around it. The MV winding 24 and the auxiliary winding 28 are galvanically insulated from the LV winding 20. The MV winding 24, the auxiliary winding 28, and LV winding 20 may be immersed in an insulation material 52 which may be contained by the container 54. The insulation material 52 may provide a galvanic insulation between the LV winding 20 on the one hand and the MV winding 24 and the auxiliary winding 28 on the other hand. The insulation material 52 may be solid, liquid or gaseous. The galvanic insulation may provide a distance d1 between the LV winding 20 and the MV winding 24 in the range of 15 mm to 20 mm, although the disclosure is not limited thereto.

The MV winding 24 and the auxiliary winding 28 of the auxiliary unit may be wound proximally in the axial direction of the core 18. The axial direction of the core may correspond to the vertical direction of the core within FIG. 3. The distance d2 between the MV winding 24 and the auxiliary winding 28 in axial direction may be in the range of 3 mm to 5 mm.

The converter 100 may further have MV bushings 50. The bushings 50 may be arranged on the container 54, or the wall of the container 54, and may provide access to the interior of the container 54. The bushings 50 may allow for electric connection to the MV winding 24 and the auxiliary winding 28. In the case of a liquid insulation material 52, the bushings 50 may be provided within a through-hole provided in the container 54 containing the electrically insulating liquid. In the case of a solid insulation material 52, the bushings 50 may provide a passage extending at least partially trough the solid insulation material 52. The bushings 50 may be configured to provide a MV insulation. In embodiments, the bushings 50 may also be provided in form of a stub formed integrally with the electric insulation surrounding the coil.

The conductors 58 of the terminal of the MV winding and conductors 56 of the terminal of the auxiliary winding of the auxiliary unit may be fed through the same bushings 50. The distance d2 between the MV winding 24 and the auxiliary winding 28 may be constant along MV winding and the auxiliary winding and/or the conductors 58 of the MV winding 24 and of the auxiliary winding 56.

The conductors of the terminal of the LV winding 20 may be fed through a different pair of bushings facing away from the container 54 (not shown).

The core 18 of the converter may be made from magnetic material with a high magnetic permeability, in particular a ferroelectric or ferrielectric material, and may have two limbs, extending in a first direction, which may be a vertical direction in FIG. 3, and may have two yokes extending in a second direction, which may be a horizontal direction in FIG. 3. A core window may extend through the core in a third direction perpendicular to both the first and second directions. In some embodiments, the dimensions of the core in the first and/or second directions are significantly larger than the dimension of the core in the third direction, so that the core may be regarded as essentially planar; albeit with a non-zero dimension of the core window in the lateral direction. Both the first and second limb may extend from the first to the second yoke and vice versa, and surround the core window.

The invention claimed is:

1. A converter for transferring power from a medium-voltage, MV, to a low-voltage, LV, side, comprising:

at least one DC/AC cell configured to generate an AC voltage from a MV DC voltage, the DC/AC cell having a MV AC terminal;

at least one AC/DC cell configured to generate a DC voltage from a LV AC voltage, the AC/DC cell having a LV AC terminal;

a magnetic core;

a LV winding wound around the magnetic core and having a LV winding terminal, the LV winding terminal connected to the LV AC terminal of the at least one AC/DC cell;

a MV winding wound around the magnetic core and having a MV winding terminal, the MV winding terminal connected to the MV AC terminal of the at least one DC/AC cell;

an auxiliary unit having an auxiliary winding wound around the same magnetic core and having an auxiliary winding terminal, the auxiliary winding terminal connected to control auxiliary circuits configured to operate the MV DC/AC cell; and a galvanic insulation configured to galvanically insulate the LV winding from the MV winding and the auxiliary winding, wherein the galvanic insulation between the LV and the MV winding and the auxiliary winding is configured to withstand the Basic Insulation Level, BIL, of the converter, of at least 10 kV.

2. The converter according to claim 1, further comprising MV bushings, wherein conductors of the terminal of the MV winding and conductors of the terminal of the auxiliary winding of the auxiliary unit are fed through the same bushings.

3. The converter according to claim 1, wherein the galvanic insulation between the LV and the MV winding is configured to withstand a voltage difference of 52 kV, 65 kV or 95 kV.

4. The converter according to claim 1, wherein the galvanic insulation provides a distance between the LV winding and the MV winding of 15 mm to 20 mm.

5. The converter according to claim 1, wherein the MV winding and the auxiliary winding of the auxiliary unit are wound proximally in the axial direction of the core, and wherein the distance between the MV winding and the auxiliary winding in axial direction is at most 15 mm or 10 mm.

6. The converter according to claim 1, wherein the terminal of the auxiliary winding is connected to the terminal of the auxiliary unit.

7. The converter according to claim 6, further comprising a series of a resonant capacitor, a diode rectifier, and a DC capacitor connected between the terminal of the auxiliary winding and the terminal of the auxiliary unit.

8. The converter according to claim 1, wherein the auxiliary unit further comprises:

a further magnetic core;

a primary and at least one secondary winding wound around the further magnetic core, the primary winding connected to the auxiliary winding, wherein the at least one secondary winding has a further terminal, the further terminal connected to the terminal of the auxiliary unit; and a further galvanic insulation configured to galvanically insulate the primary winding from the at least one secondary winding.

9. The converter according to claim 8, further comprising a series of a resonant capacitor, a diode rectifier, and a DC capacitor connected between the further terminal of the at least one secondary winding and the terminal of the auxiliary unit.

10. The converter according to claim 1, wherein the at least one DC/AC cell comprises a further terminal, the converter comprising:

at least one further AC/DC cell configured to generate a DC voltage from a MV AC voltage, the at least one further AC/DC cell having a terminal; and at least one DC link connected to the terminal of the at least one further AC/DC cell and the further terminal of the at least one DC/AC cell, wherein the terminal of the auxiliary unit is connected to control auxiliary circuits and configured to operate the AC/DC cell.

11. The converter according to claim 1, wherein the auxiliary circuits configured to operate the DC/AC cell and/or the AC/DC cell comprise electronic switches.

12. The converter according to claim 11, wherein the electronic switches of the control equipment configured to operate the AC/DC cell are connected in one of a full-bridge, a half-bridge, flying-capacitor-based bridge configurations, and diode-clamped configurations.

13. The converter according to claim 1, wherein the terminal of the auxiliary unit is configured to provide at least one auxiliary power of at least one of 10 W, 50 W, or 100 W.

14. The converter according to claim 1, further comprising fans, the terminal of the auxiliary unit connected to the fans.

15. The converter according to claim 1, wherein the converter is a medium-frequency or a high-frequency converter.

* * * * *